(12) United States Patent
Miller

(10) Patent No.: US 8,665,049 B2
(45) Date of Patent: Mar. 4, 2014

(54) GRAPHENE-COATED COUPLING COIL FOR AC RESISTANCE REDUCTION

(75) Inventor: John M. Miller, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 1 day.

(21) Appl. No.: 13/526,662

(22) Filed: Jun. 19, 2012

(65) Prior Publication Data

US 2013/0020877 A1 Jan. 24, 2013

Related U.S. Application Data

(60) Provisional application No. 61/510,210, filed on Jul. 21, 2011, provisional application No. 61/510,206, filed on Jul. 21, 2011.

(51) Int. Cl.
*H01F 27/30* (2006.01)
*H01F 27/28* (2006.01)
*G01V 3/00* (2006.01)

(52) U.S. Cl.
USPC .............................. 336/195; 336/222; 324/318

(58) Field of Classification Search
USPC .......... 336/179, 182, 195, 220, 222; 324/318, 324/322; 977/734, 742, 750, 842, 843; 423/447, 448, 449.2
See application file for complete search history.

(56) References Cited

U.S. PATENT DOCUMENTS

| | | | |
|---|---|---|---|
| 4,698,473 A * | 10/1987 | Alcini et al. | 219/677 |
| 7,889,042 B2 * | 2/2011 | Meinke | 336/200 |
| 2011/0018539 A1 * | 1/2011 | Viswanathan | 324/318 |
| 2011/0024158 A1 | 2/2011 | Tsotsis et al. | |
| 2011/0135884 A1 * | 6/2011 | Lettow et al. | 428/174 |
| 2012/0019236 A1 * | 1/2012 | Tiernan et al. | 324/234 |
| 2012/0182631 A1 * | 7/2012 | Le et al. | 359/822 |
| 2012/0227925 A1 * | 9/2012 | Sweeney | 165/10 |

FOREIGN PATENT DOCUMENTS

| | | |
|---|---|---|
| RU | 2 250 551 C2 | 4/2005 |
| SU | 866590 A | 9/1981 |

OTHER PUBLICATIONS

International Search Report and Written Opinion dated Oct. 11, 2012, issued in International Application No. PCT/US2012/043088.
Lee, S-H et al., "Development and Validation of Model for 95%-Efficiency, 220-W Wireless Power Transfer Over a 30-cm Air Gap" IEEE Energy Conversion Congress & Exposition (Sep. 18-23, 2010) pp. 885-892.
Mizuno, T. et al., "Reduction of Proximity Effect in Coil Using Magnetoplated Wire" IEEE Transactions on Magnetics (Jun. 2007) pp. 2654-2656, vol. 43, No. 6.
Shinaqawa, H. et al., "Theoretical Analysis of AC Resistance in Coil Using Magnetoplated Wire" IEEE Transactions on Magnetics (Sep. 2009) pp. 3251-3259, vol. 45, No. 9.

* cited by examiner

*Primary Examiner* — Alexander Talpalatski
*Assistant Examiner* — Joselito Baisa
(74) *Attorney, Agent, or Firm* — Scully, Scott, Murphy & Presser, P.C.

(57) ABSTRACT

At least one graphene layer is formed to laterally surround a tube so that the basal plane of each graphene layer is tangential to the local surface of the tube on which the graphene layer is formed. An electrically conductive path is provided around the tube for providing high conductivity electrical path provided by the basal plane of each graphene layer. The high conductivity path can be employed for high frequency applications such as coupling coils for wireless power transmission to overcome skin depth effects and proximity effects prevalent in high frequency alternating current paths.

20 Claims, 13 Drawing Sheets

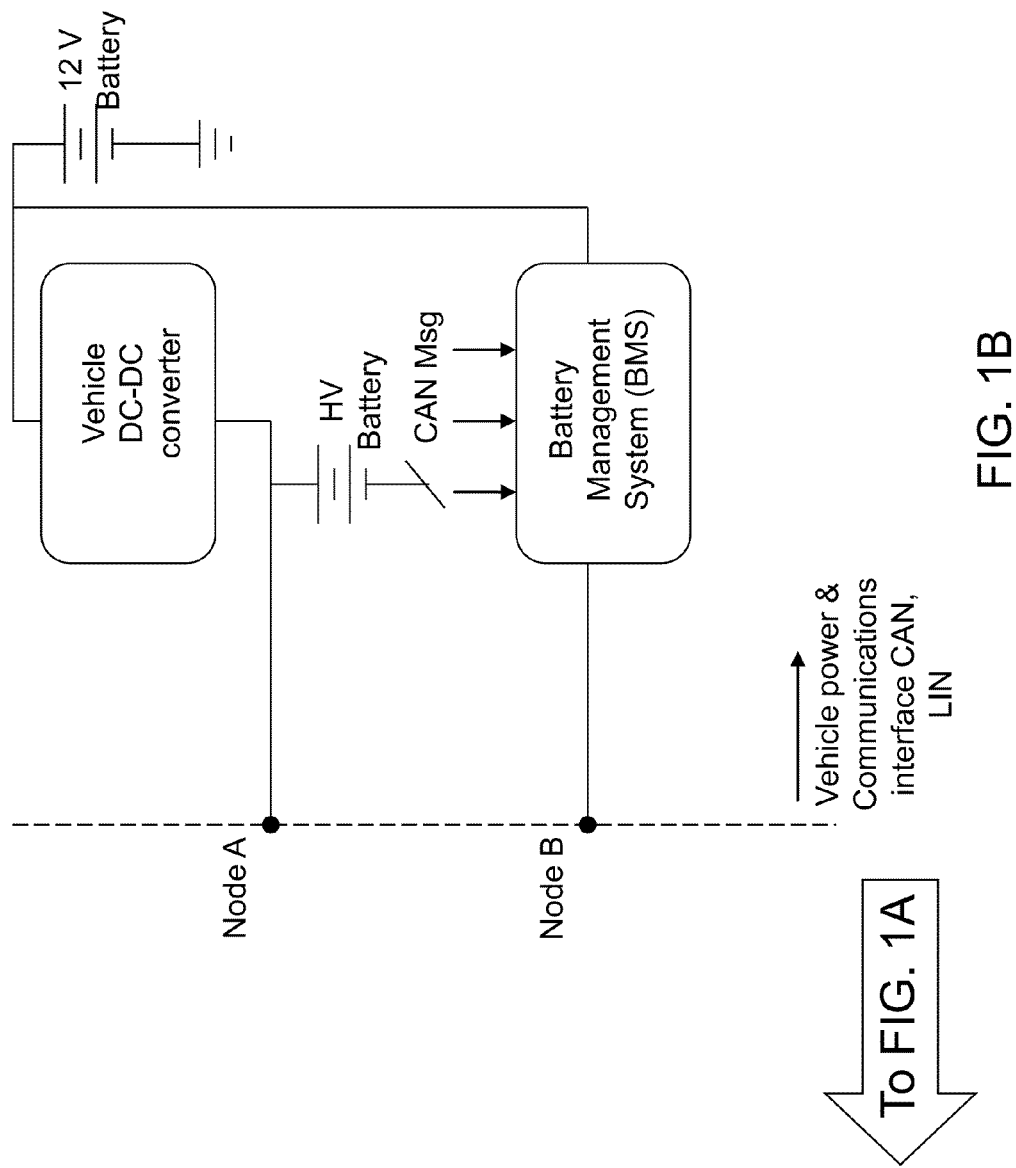

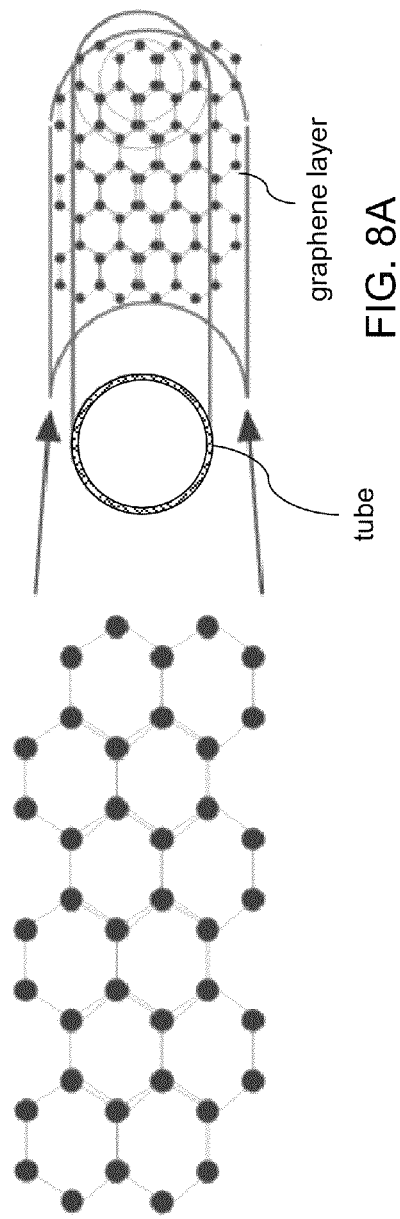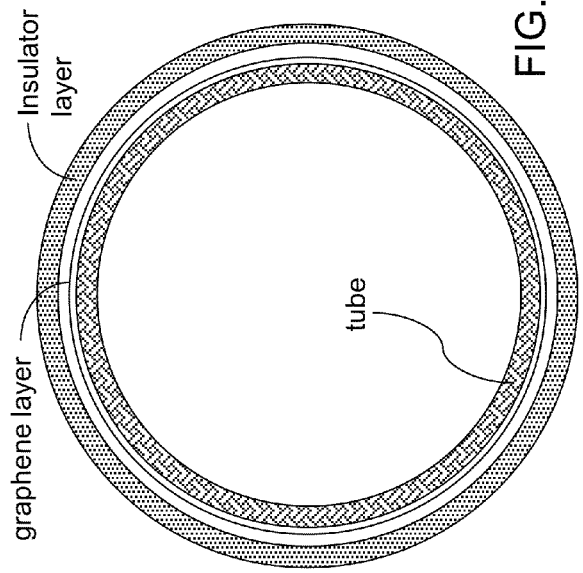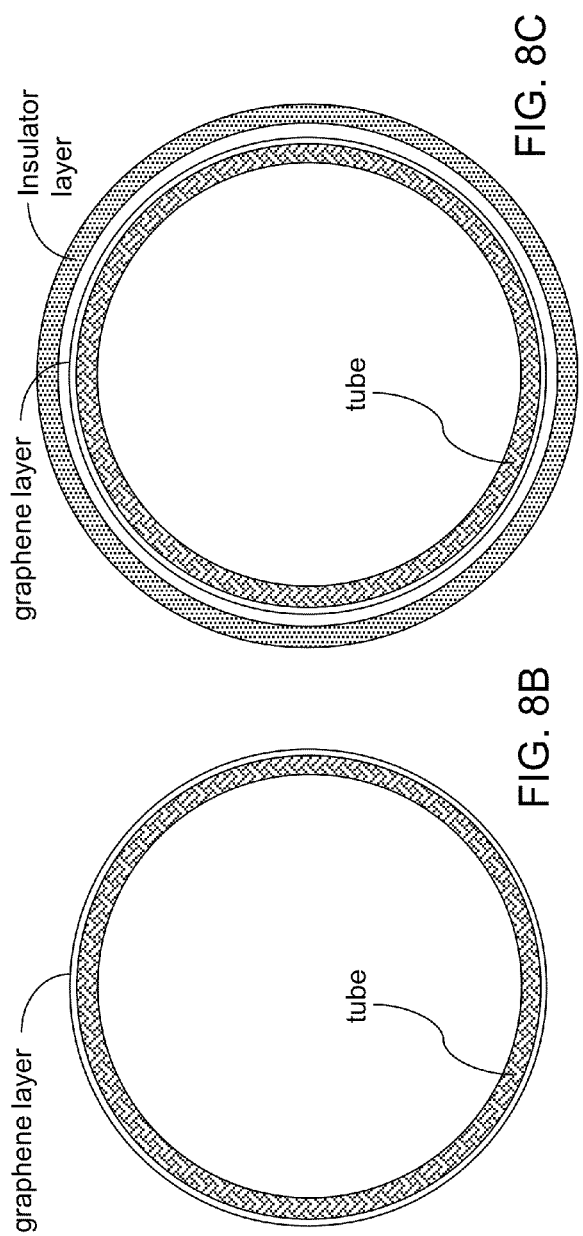

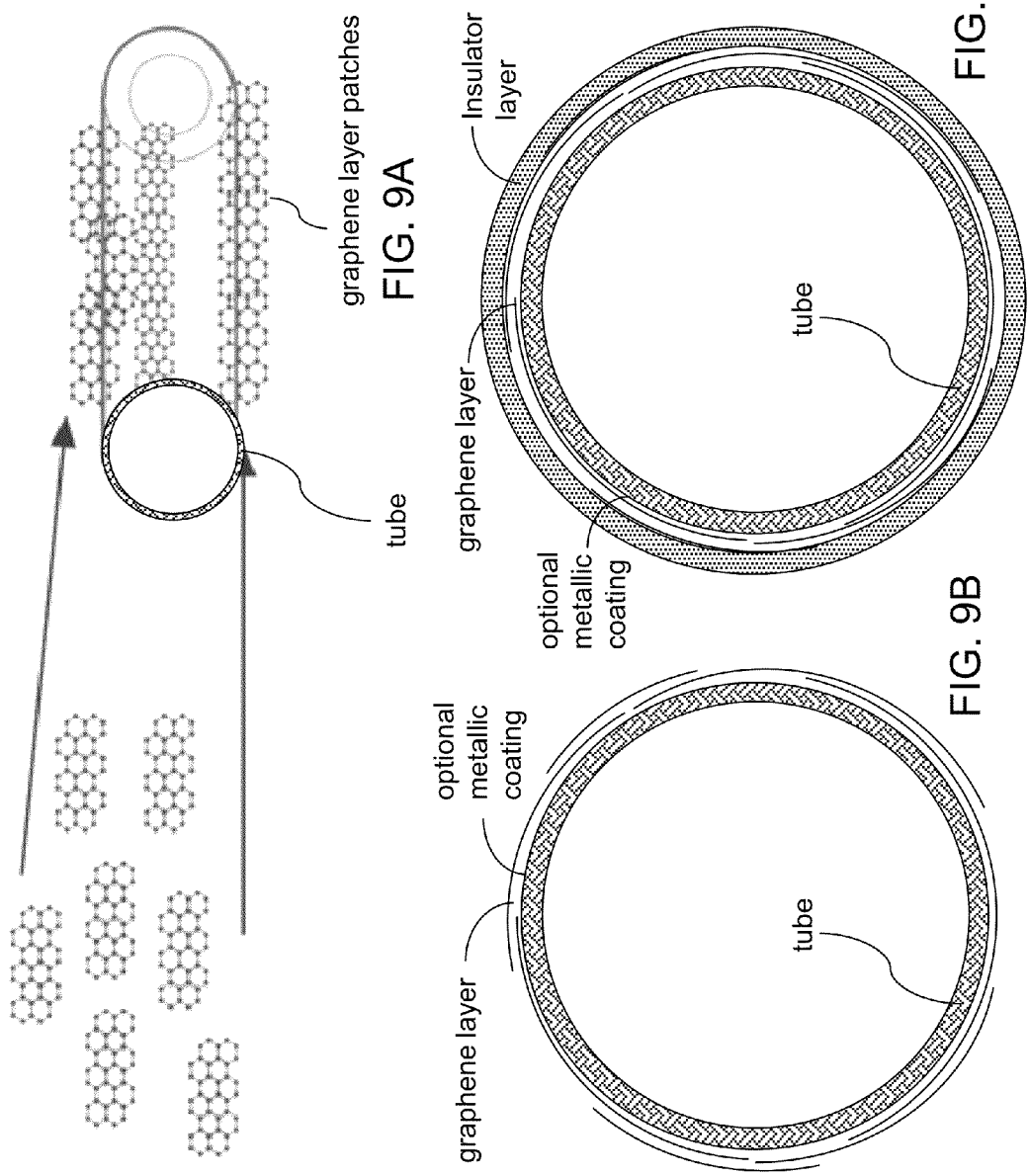

GRAPHENE-COATED COUPLING COIL FOR AC RESISTANCE REDUCTION

CROSS-REFERENCE TO RELATED APPLICATIONS

This application claims the benefit of priority from U.S. provisional application No. 61/510,210, filed on Jul. 21, 2011, and from U.S. provisional application No. 61/510,206, filed on Jul. 21, 2011, the entire contents of which are incorporated herein by reference.

STATEMENT REGARDING FEDERALLY SPONSORED RESEARCH OR DEVELOPMENT

This invention was made with United States government support under Prime Contract No. DE-AC05-000R22725 awarded by the U.S. Department of Energy. The United States government has certain rights in this invention.

FIELD OF THE INVENTION

The present invention relates to the field of wireless power transfer, and particularly to graphene-coated coupling coils for reducing alternating current (AC) resistance for high frequency AC applications.

BACKGROUND OF THE INVENTION

Electromagnetic waves attenuate as the waves penetrate into a conducting medium. As a result, the alternating current over the cross section of a conductor or the alternating magnetic flux over the cross section of a magnetic circuit is not distributed uniformly, but is located chiefly in the surface layer. The skin effect is due to the production of eddy currents when an electromagnetic wave propagates in a conducting medium. Thus, skin effect causes high frequency electrical current to flow on surface regions of a conductive material, thereby increasing the alternating current (AC) resistance of a conductive wire to increase significantly over the direct current (DC) resistance of the conductive wire.

Further, proximity effect limits regions in which AC current flows in a plurality of conductive wires proximately placed among one another by the interaction of electromagnetic fields generated by the electrical current flowing through different conductive wires. The result of the proximity effect is further increase in the AC resistance of a plurality of conductive wires over the DC resistance of the plurality of conductive wires above the increase caused by the skin depth effect. The combination of the skin effect and the proximity effect can result in significant increase in the AC resistance of a plurality of conductive wires in high frequency applications.

SUMMARY OF THE INVENTION

At least one graphene layer is formed to laterally surround a tube so that the basal plane of each graphene layer is tangential to the local surface of the tube on which the graphene layer is formed. An electrically conductive path is provided around the tube for providing high conductivity electrical path provided by the basal plane of each graphene layer. The high conductivity path can be employed for high frequency applications such as coupling coils for wireless power transmission to overcome skin depth effects and proximity effects prevalent in high frequency alternating current paths.

According to an aspect of the present disclosure, a structure including a coupling coil for coupling a magnetic field with another coupling coil is provided. The coupling coil includes: a support structure generally shaped to provide at least one loop and extending along a lengthwise direction at each portion thereof; and a coating of at least one graphene layer that circumferentially surrounds the support structure. A basal plane of the at least one graphene layer is tangential to a local surface of the support structure at each point in a circumference of the support structure.

According to another aspect of the present disclosure, a method of operating a structure is provided. The method includes providing a structure including a coupling coil for coupling a magnetic field with another coupling coil. The coupling coil includes: a support structure generally shaped to provide at least one loop and extending along a lengthwise direction at each portion thereof; and a coating of at least one graphene layer that circumferentially surrounds the support structure. A basal plane of the at least one graphene layer is tangential to a local surface of the support structure at each point in a circumference of the support structure. The method further includes passing alternating current (AC) electrical current through the coupling coil, wherein a predominant portion of the AC electrical current flows through the coating of the at least one graphene layer.

According to yet another aspect of the present disclosure, a conductive structure is provided, which includes: a support structure extending along a lengthwise direction; and a coating of at least one graphene layer that circumferentially surrounds the support structure, wherein a basal plane of the at least one graphene layer is tangential to a local surface of the support structure at each point in a circumference of the support structure.

According to even another aspect of the present disclosure, a method of operating a conductive structure is provided. The method includes providing the conductive structure including: a support structure extending along a lengthwise direction; and a coating of at least one graphene layer that circumferentially surrounds the support structure. A basal plane of the at least one graphene layer is tangential to a local surface of the support structure at each point in a circumference of the support structure. The method further comprises passing alternating current (AC) electrical current through the conductive structure, wherein a predominant portion of the AC electrical current flows through the coating of the at least one graphene layer.

According to still another aspect of the present disclosure, a wireless power transfer system is provided, which includes: a primary circuit including a grid converter and a primary coil located in a primary pad; and a secondary circuit located in a vehicle and including a secondary coil. The primary coil includes: a first support structure generally shaped to provide at least one first loop and extending along a lengthwise direction at each portion thereof; and a first coating of at least one graphene layer that circumferentially surrounds the support structure. A basal plane of the at least one graphene layer is tangential to a local surface of the support structure at each point in a circumference of the support structure.

According to a further aspect of the present disclosure, a method of operating a wireless power transfer system is provided. The method includes providing a wireless power transfer system including: a primary circuit including a grid converter and a primary coil located in a primary pad; and a secondary circuit located in a vehicle and including a secondary coil. The primary coil includes: a first support structure generally shaped to provide at least one first loop and extending along a lengthwise direction at each portion thereof; and a first coating of at least one graphene layer that circumferentially surrounds the support structure. A basal plane of the at least one graphene layer is tangential to a local surface of the support structure at each point in a circumference of the support structure. The method further includes providing input power to the primary circuit through the grid converter; and transferring power to the vehicle by coupling an alternating current (AC) magnetic field generated by the primary coil and with the secondary coil.

BRIEF DESCRIPTION OF THE DRAWINGS

FIGS. 1A and 1B show a functional diagram of an exemplary wireless power transfer system according to an embodiment of the present disclosure.

FIG. 8A is a schematic illustration of a first conductive structure according to an embodiment of the present disclosure.

FIG. 8B is a cross-sectional view of the first conductive structure according to an embodiment of the present disclosure.

FIG. 8C is a cross-sectional view of a variation of the first conductive structure according to an embodiment of the present disclosure.

FIG. 9A is a schematic illustration of a second conductive structure according to an embodiment of the present disclosure.

FIG. 9B is a cross-sectional view of the second conductive structure according to an embodiment of the present disclosure.

FIG. 9C is a cross-sectional view of a variation of the second conductive structure according to an embodiment of the present disclosure.

DETAILED DESCRIPTION OF THE INVENTION

As stated above, the present invention relates to coupling coils configured for reducing alternating current (AC) resistance employing a graphene coating, which is now described in detail with accompanying figures. The drawings are not drawn to scale.

As used herein, a "grid converter" herein refers to a device that takes alternating current (AC) supply voltage having a frequency less than 1 kHz and generated alternating current (AC) supply voltage having a frequency greater than 1 kHz.

To address the requirement of interoperability for wireless power transfer (WPT), global standardization of WPT operating frequency, coupling coil dimensions and locations on both parking space and vehicle, and the treatment of misalignment between the vehicle mounted receiver coil and the floor mounted (on or embedded in) transmit coil can be employed. For example, SAE J2954 Wireless Charging Task Force has the charter to develop such standards, safety and emissions, and bidirectional communications.

The requirement of safety is inherently satisfied in WPT because the magnetic transfer eliminates the need for vehicle leakage current detection and minimization to prevent shock hazard. This minimizes the need for galvanic isolation of the WPT charging system components so that the power delivered may be taken directly to the vehicle battery pack. However, safety also involves magnetic and electric field emissions and these are already covered by international standards such as ICNIRP and ARPANSA.

Figure 1A:
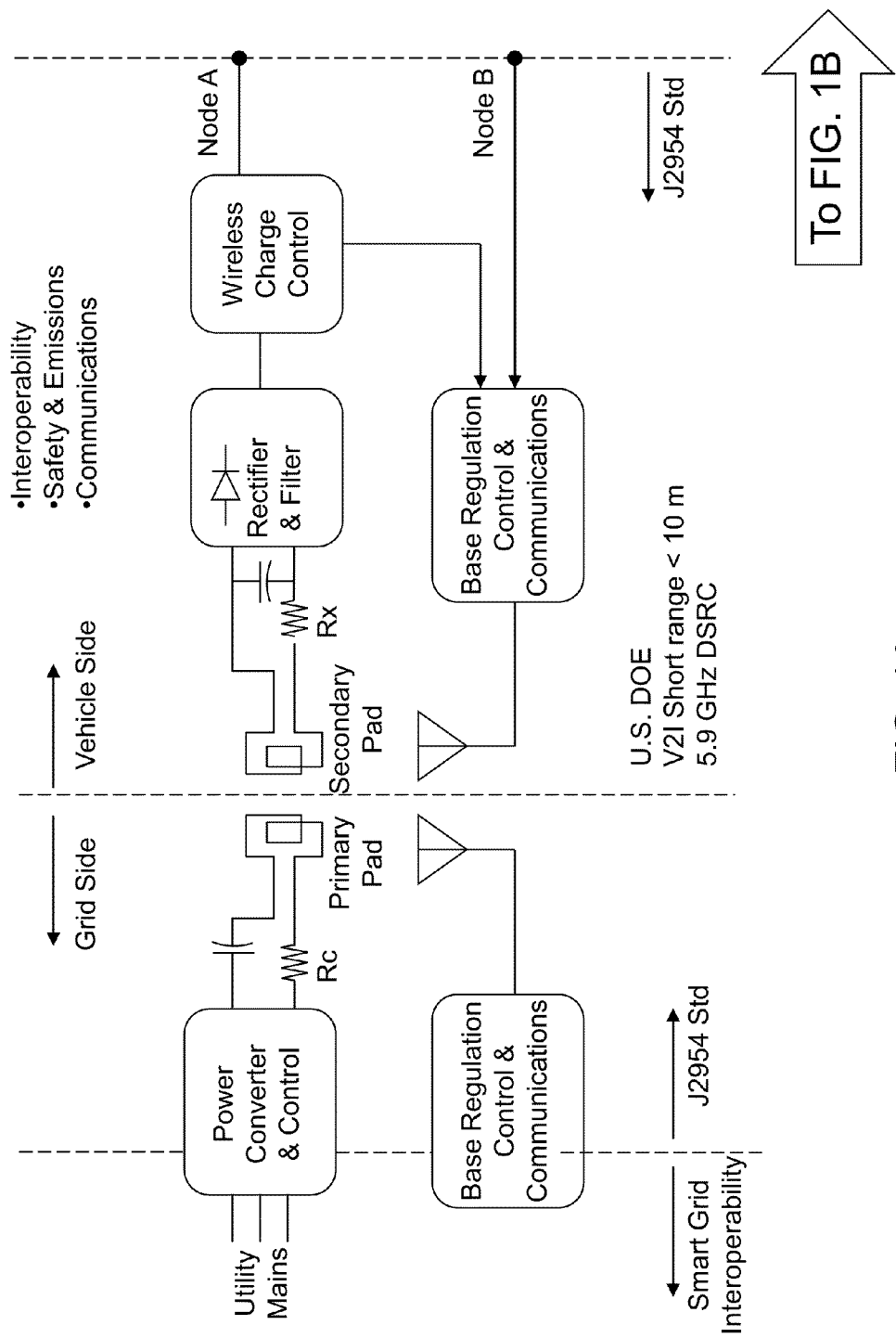

The requirement of bidirectional communications can be satisfied employing vehicle to infrastructure (V2I) communications for the purpose of communicating vehicle location relative to the charging pad, activation signals and regenerative energy storage system (RESS) state-of-charge (SOC), state-of-health (SOH) if needed, charge rate, temperatures, voltage, etc to the grid connected power inverter. The grid converter on the other hand may initiate power transfer by communicating with the vehicle to insure proper location relative to the transmit pad, all clear signals that no obstacles or biologics are present in the active zone and utility rate and time of use (TOU) data for most economic charging. Coil to coil location, all clear signal, activate signal, power level and inhibit signals can be employed to provide proper energy management between the WPT charger and the vehicle RESS. The functional diagram in FIGS. 1A and 1B illustrates the overall scheme for energy management and RESS pack regulation needed in WPT.

In the functional diagram of FIG. 1, the grid connected power converter is connected to an appropriate utility service such as a 240 $V_{ac}$, single phase line for level 2 power feed at 3 kW to 7 kW. As used herein, $V_{ac}$ refers to an alternating current voltage, and $V_{dc}$ refers to a direct current voltage. For higher power levels such as direct current (DC) fast charge level 2 (40 kW to 70 kW) or DC fast charge level 3 (>70 kW and up to 250 kW or higher), a 480 $V_{ac}$ and 3-phase connection, or higher voltage such as direct connection to medium voltage distribution line (2.4 kV to 11 kV) can be employed. Once such a power supply is provided, it is feasible to use such high power WPT for commercial applications such as shuttles, trolleys, and transit bus wireless charging. Rectified mains voltage, $U_d$, is processed by a power converter and control module to a controlled duty ratio quasi-square wave at the specified operating frequency as the means to regulate the power delivery.

Resonant magnetic coupling provides a coupling between a primary circuit located on the grid side, i.e., on a charging facility, and a secondary circuit located on a vehicle side, i.e., within a vehicle. Specifically, resonant magnetic coupling provides the non-contacting power transfer medium from a primary coil of the primary circuit located in a primary pad to a vehicle mounted receiver coil, i.e., a secondary coil of the secondary circuit located in a secondary pad that is mounted to the vehicle.

A rectifier and filter module converts the alternating current induced in the secondary coil into a direct current voltage, which applied to a high voltage (HV) battery through a wireless charge control module. A battery management system (BMS) monitors the state of the HV battery, and provides information to a component, within the vehicle, of a base regulation control and communications module. The HV battery can be configured to provide a DC voltage, for example, in a range from 100 V to 1 kV. A vehicle DC-DC converter can be employed to charge a 12 V battery within the vehicle to supply ancillary loads.

Figure 2:
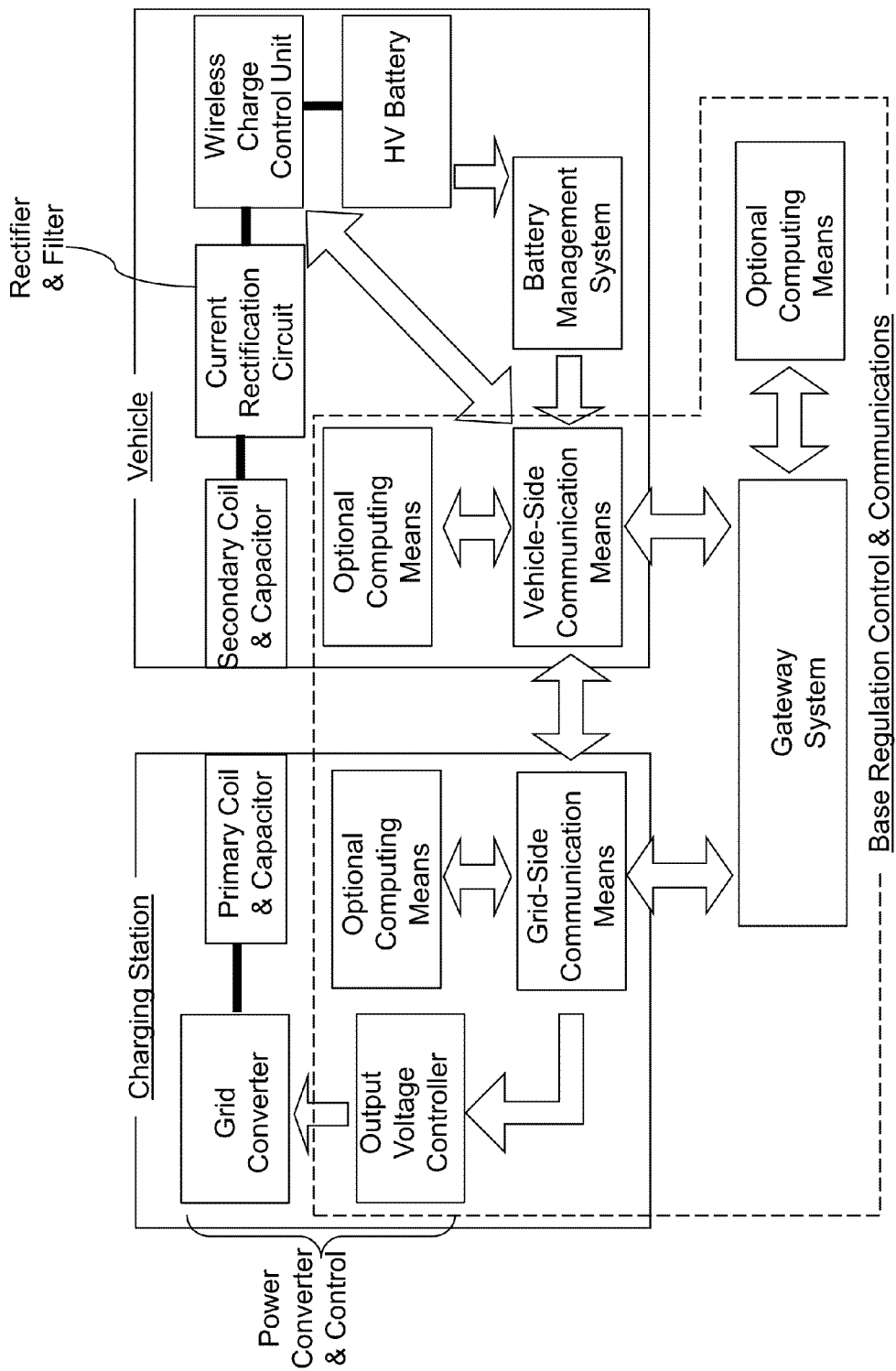
FIG. 2 shows a schematic of a portion of the exemplary wireless power transfer system of FIGS. 1A and 1B according to an embodiment of the present disclosure.

Referring to FIG. 2, a portion of the exemplary wireless power transfer system of FIGS. 1A and 1B is schematically illustrated. The system includes a charging station, a vehicle, and an optional gateway system, and an optional computing means in communication with the gateway system. The charging station includes the primary circuit, which includes the grid converter and the primary coil. The vehicle includes the secondary circuit, which includes the secondary coil, the current rectification circuit, a wireless charge control unit, and a high voltage (HV) battery. The total impedance of the current rectification circuit, the wireless charge control unit, and the HV battery as seen by the combination of the secondary coil and a parallel tuning capacitor of the secondary circuit is herein referred to as the load of the secondary circuit.

The primary circuit includes a grid converter and a primary coil located in a primary pad. The secondary circuit is located in the vehicle and includes a secondary coil, a parallel tuning capacitor, a current rectification circuit connected to the secondary coil, and a battery connected to the current rectification circuit. The vehicle further includes a battery management system configured to measure at least one parameter of the battery, and a vehicle-side communication means configured to transmit information on the at least one parameter of the battery. The at least one parameter is a measure of an effective resistance of the battery as seen by the primary circuit. The charging station can further include an output voltage controller configured to control an alternating current (AC) output voltage of the grid converter based on information derived from the at least one parameter of the battery.

In one embodiment, the AC output voltage can be a quasi-square wave or a square wave, and has a duty ratio in a range from, and including, 0 to, and including, 1. The output voltage controller can be configured to control at least one of a duty cycle of the AC output voltage, a frequency of the AC output voltage, and a magnitude of the AC output voltage. Additionally or alternately, the output voltage controller can be configured to control a duty cycle of the AC output voltage, a frequency of the AC output voltage, and a magnitude of the AC output voltage.

In one embodiment, the at least one parameter of the battery measured by the battery management system can include at least one of temperature of the battery, a voltage level of the battery, and state of charge of the battery. In one embodiment, the at least one parameter of the battery measured by the battery management system can include the temperature of the battery, voltage level of the battery, and state of charge of the battery. Additionally or alternately, the at least one parameter of the battery measured by the battery management system can include the charge rate of the HV battery.

In one embodiment, the at least one parameter of the battery measured by the battery management system can include a parameter that is identical to, or is linearly proportional to, the effective resistance of the battery as seen by the primary circuit.

Optionally, a gateway system can be provided. The gateway system can be configured to receive information on the at least one parameter of the battery as transmitted by the vehicle-side communication means, and can be configured to transmit the information derived from the at least one parameter, directly or indirectly, to the output voltage controller. In one embodiment, the gateway system can employ internet.

In one embodiment, a grid-side communication means can be provided. The grid-side communication means can be configured to receive the information derived from the at least one parameter, and can be configured to relay the information derived from the at least one parameter to the output voltage controller.

In one embodiment, the information derived from the at least one parameter of the battery includes a target value for each of one or more waveform parameters of the AC output voltage of the grid converter. In one embodiment, a computation means configured to generate the one or more target values from the at least one parameter of the battery can be provided within the vehicle, within the charging station, or outside the vehicle and outside the charging station as an independent unit. The computing means is in communication with at least one of a vehicle-side communication means provided within the vehicle, a grid-side communication means provided within the charging station, or with the gateway system. The vehicle-side communication means, the grid-side communication means, the computing means, the output voltage controller for the grid converter, and the optional gateway system collectively constitute a base regulation control and communications system.

In one embodiment, the gateway system can be configured to receive information on the at least one parameter of the battery as transmitted by the vehicle-side communication means, and can be configured to transmit the one or more target values for each of one or more waveform parameters of the AC output voltage of the grid converter, directly or indirectly, to the output voltage controller. The computation means can be in communication with the gateway system.

In one embodiment, the computation means can be located within the vehicle and can be in communication with the battery management system and the vehicle-side communication means. The information on the at least one parameter of the battery as transmitted by the vehicle-side communication means can include the one or more target values for each of one or more waveform parameters of the AC output voltage of the grid converter.

In one embodiment, the computation means can be located within a facility that houses the grid converter, i.e., within the charging station. The computation means can be in communication with the vehicle-side communication means directly or indirectly, and the one or more target values for each of one or more waveform parameters of the AC output voltage of the grid converter can be provided to the grid converter.

In one embodiment, the one or more target values for each of one or more waveform parameters of the AC output voltage of the grid converter can include a target frequency for the AC output voltage. Additionally or alternately, the one or more target values for each of one or more waveform parameters of the AC output voltage of the grid converter can include a target magnitude for the AC output voltage. Additionally or alternately, the one or more target values for each of one or more waveform parameters of the AC output voltage of the grid converter can include a target value for a parameter that controls a magnitude of a fundamental component of the AC output voltage.

In one embodiment, the at least one parameter of the battery that the battery management system measures can include the temperature of the battery and the state of charge (SOC) of the HV battery. As used herein, the state of charge of the battery refers to the ratio of the energy stored in a battery ($Wh_x$) to the total (100% SOC) energy storage capacity of the battery ($Wh_{100}$). The computation means can be configured to determine a charge rate of the battery from the temperature of the battery and the SOC of the battery.

In one embodiment, the at least one parameter of the battery that the battery management system measures can further include a voltage level of the battery. The computation means can be configured to determine the effective resistance of the battery as seen by the primary circuit. Further, the computation means can be configured to determine an input impedance of the secondary circuit as seen by the primary circuit. In addition, the computation means can be configured to determine a frequency at which an imaginary component of input impedance of a circuit including the primary circuit and incorporating the input impedance of the secondary circuit becomes zero.

The primary pad housing the primary coil can be located in any place that a vehicle can be placed proximately to. In one embodiment, the primary coil can be located within a facility configured to park or store vehicles. In another embodiment, the primary coil can be located underneath, or over, a road configured to allow vehicles to pass through. In yet another embodiment, the primary coil can be located within a structure located on a side of a road configured to allow vehicles to pass through.

In a non-limiting exemplary embodiment, the output voltage controller and the grid-side communications means can be embodied in a grid converter V2I communications and regulation control unit. The grid converter V2I communications and regulation control unit can receive, directly or indirectly from the vehicle, dedicated short range communications (DSRC) message for charge level and frequency offset needed for energy management of the regenerative energy storage system (RESS) pack.

The base regulation control and communications function interprets the DSRC message as a command for grid converter duty ration d* and frequency offset f*. The grid converter duty ratio d* provided to the grid converter regulates WPT power level by adjusting the fundamental component, $U_1(t)$, applied to the series resonant primary of the coupling coil assembly. In this expression $T_1=1/f$, and f represents the operating frequency of WPT (when standardized: 10 kHz<f<140 kHz), and pulse time τ is given by $d*T_1/2$.

Figure 3A:
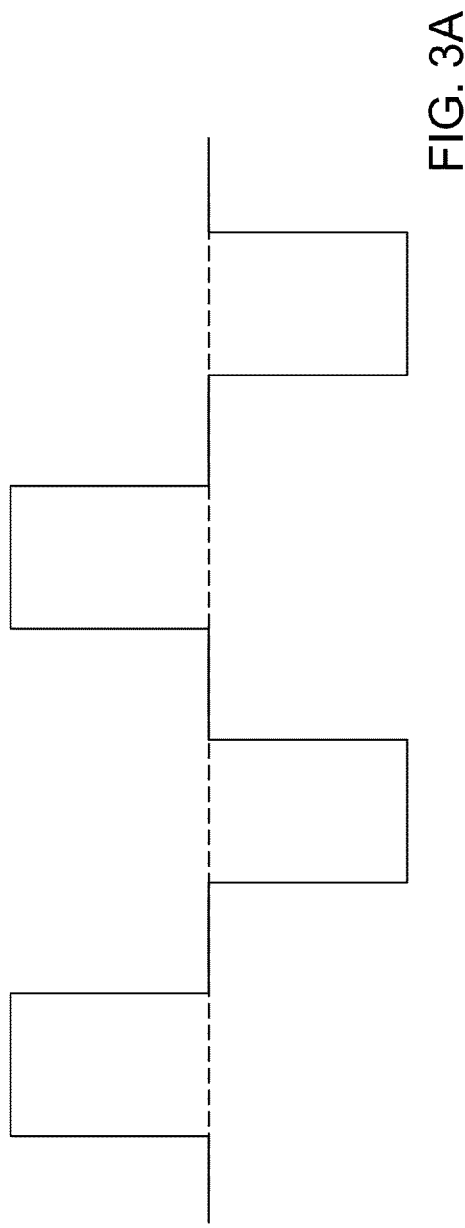
FIG. 3A is a schematic waveform of an alternating current (AC) output voltage of a grid converter according to an embodiment of the present disclosure.
Figure 3B:
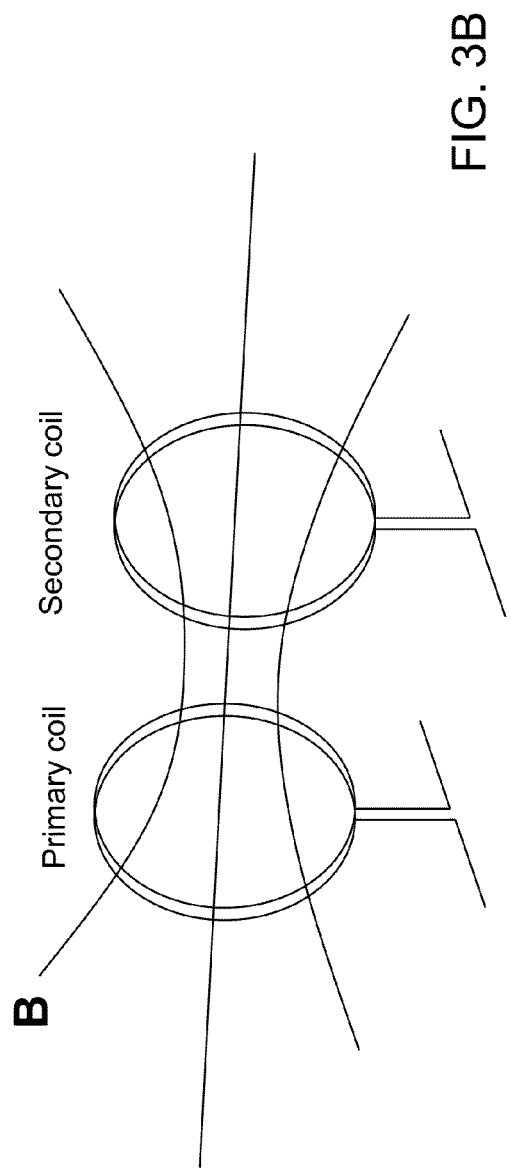
FIG. 3B is a schematic diagram illustrating coupling of a magnetic field between a primary coil and a secondary coil according to an embodiment of the present disclosure.
Figure 3C:
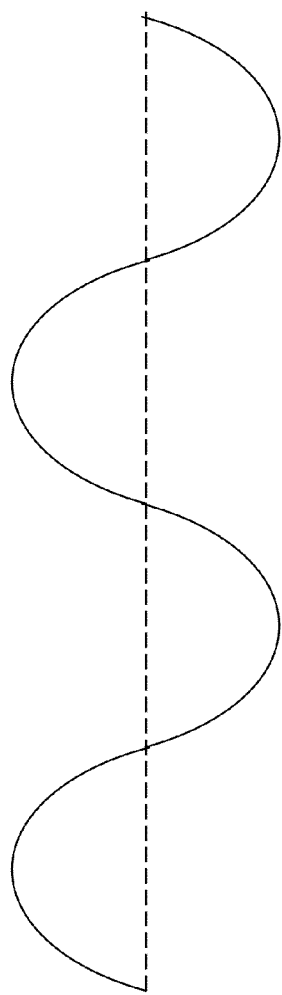
FIG. 3C is a schematic waveform of a secondary current through the secondary coil according to an embodiment of the present disclosure.
Figure 3D:
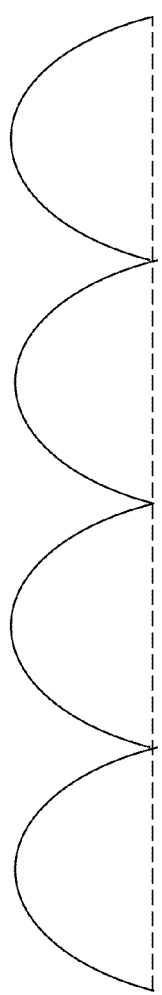
FIG. 3D is a schematic waveform of a rectified current according to an embodiment of the present disclosure.
Figure 3E:
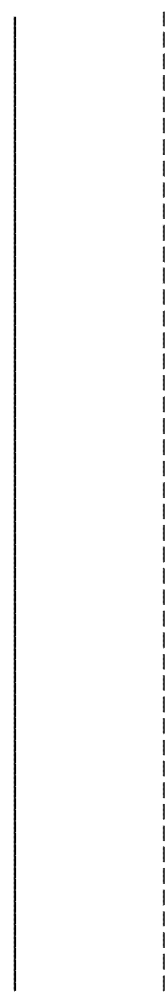
FIG. 3E is a schematic waveform of an ideal direct current (DC) voltage applied across a battery to be charged according to an embodiment of the present disclosure.

Wireless charge coupling coil transmission of the power generated by the grid converter as quasi-square wave voltage to a rectified direct current voltage is illustrated in FIGS. 3A-3E. The quasi-square wave voltage generated by the grid converter can have the waveform illustrated in FIG. 3A. The magnetic coupling between the primary coil and the secondary coil of the magnetic field B as illustrated in FIG. 3B induces a nearly sinusoidal secondary current through the secondary coil of the secondary circuit as illustrated in FIG. 3C. The nearly sinusoidal current is rectified to provide an input voltage as illustrated in FIG. 3D. The receiver WPT coil output, after rectification, is applied to a filter to smooth the high frequency AC ripple prior to injection into the battery pack (assumed to be lithium-ion) of the HV battery. The voltage applied to the HV battery is schematically illustrated in FIG. 3E. The dotted lines in FIGS. 3A, 3C, 3D, and 3E refer to electrical ground, i.e., the voltage of 0 V.

In one embodiment, signals from the battery management system (BMS) and supporting messages from the vehicle CAN network can be routed via the vehicle regulation control and DSRC communications to the grid controller to manage RESS charging. In one embodiment, the EMS signals can include the RESS pack SOC and the temperature, which can be employed to determine the grid converter duty ratio d*. Coupling coil spacing, alignment and RESS charge rate necessitate an additional control signal for frequency offset f*.

Figure 4:
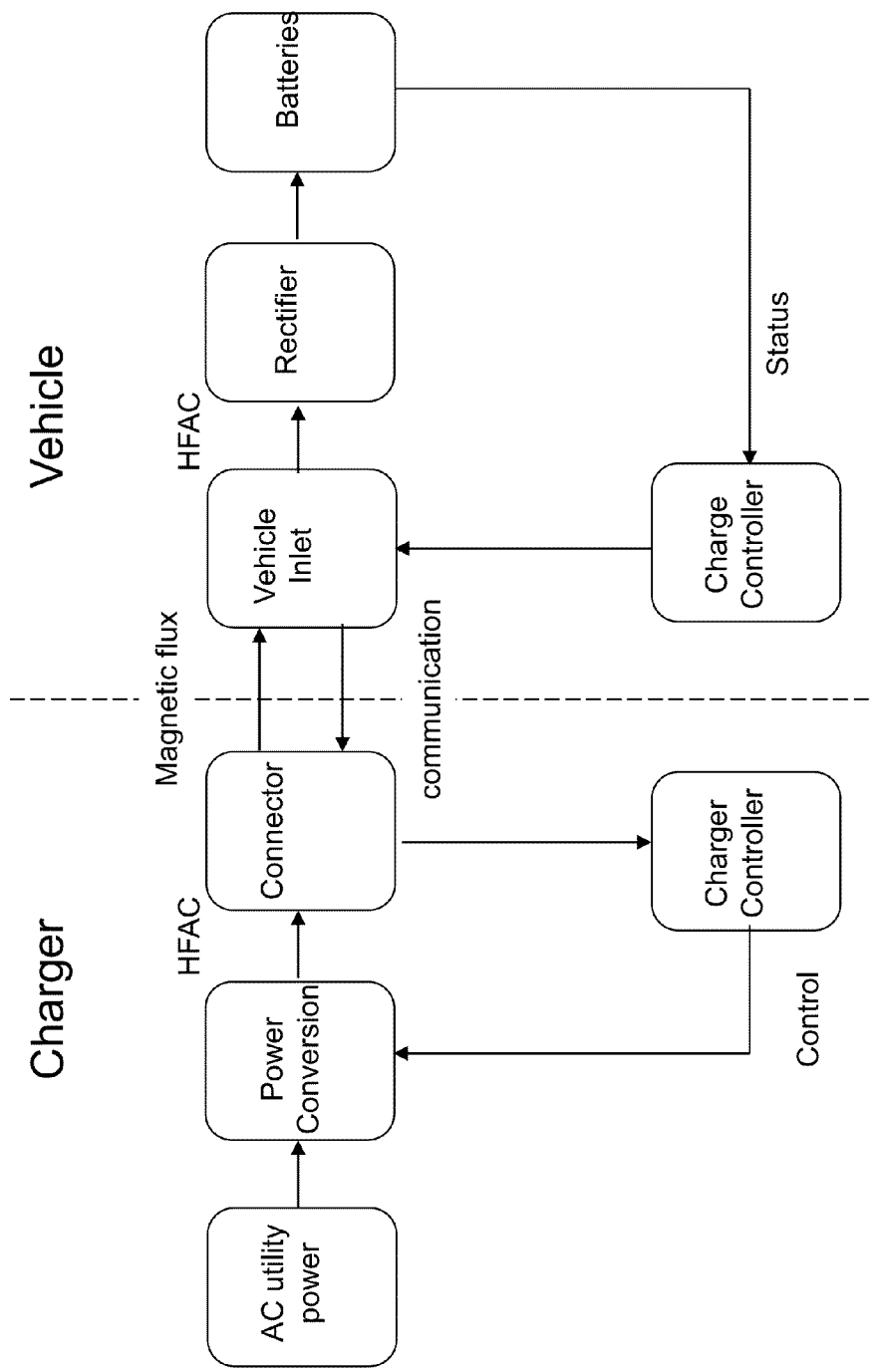
FIG. 4 is a high level functional diagram for the WPT illustrating various modules of an exemplary wireless power transfer system according to an embodiment of the present disclosure.

FIG. 4 is a high level functional diagram for the WPT. The functional diagram of FIG. 4 highlights the major elements of wireless power transmission. The power flow path includes the magnetic flux that passes through the coupling coils, i.e., the primary coil and the secondary coil.

In one embodiment, the communications channel can adhere to U.S. department of transportation (DOT) dedicated short range communications (DSRC), a 5.9 GHz band dedicated to 10 m to 300 m bidirectional, private and secure communications. This channel can be used for all V2I communications. For example, initial hand shaking between the base grid connected power converter and the vehicle can be first performed. The initial hand shaking can take the form of the grid side WPT system assisting in vehicle alignment by interacting through a vehicle parking aid for instance. Subsequently, the system can ensure that no obstacles or biologics are present in the active field zone before enabling the power transfer.

Regarding the power flow regulation, the status signal can be derived from the vehicle on-board battery (RESS), and can become available over the vehicle CAN from the BMS. The status signal can include messages for temperature, SOC, SOH, and a command for inhibiting charging. The feedback signals can include, for example, an enable/inhibit WPT signal, the power rate parameters (such as charge rate $P_{chg}$ and the grid converter duty ratio d*), the frequency offset (f*), and any information associated with charging from multiple pad units such as may be found in a parking structure.

Thus, signals between the grid charger and vehicle can positively identify the vehicle as being parked above transmit pad k of N, where N is the number of individual pads capable of being energized at maximum power from a single grid converter. For the case of on-road dynamic charging this same signal will be used to sequence and energize small groups of embedded transmit coils, for example, 3 at a time out of dozens along a stretch of highway all driven by a single, high power grid converter.

Figure 5:
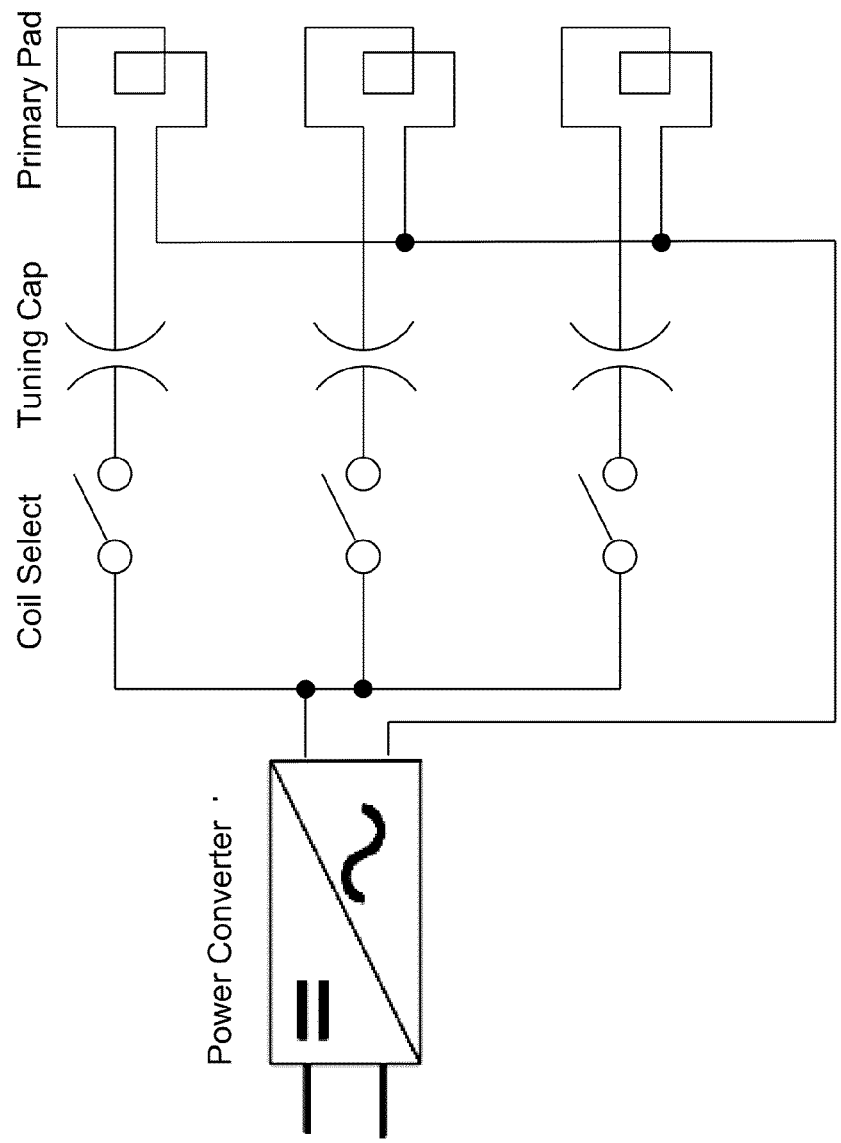
FIG. 5 is a schematic illustrating of the grid side of a wireless power transfer system in a configuration in which a plurality of primary circuits are present according to an embodiment of the present disclosure.

Referring to FIG. 5, a schematic for a charging station is shown, which can be employed for residential, stationary charging and public parking structure parking. A single grid charger is connected to a pair of transmit pads. In general these transmit pads will be individually energized by the power converter via dedicated switchgear and tuning capacitor modules. A vehicle parked above one transmit pad (primary pad) in a parking structure can cause only the pad that the vehicle is parked on energized, while not energizing any other transmit pad in the adjacent parking spaces where occupants can be standing while unloading the vehicle. Each transmit pad is tuned with a separate high voltage and high current ac capacitor.

In an exemplary evanescent wave power transfer demonstrator employed in the course of the research leading to the present disclosure, the tuning capacitors were 600 V high current induction heating units. A higher DC input voltage can also be employed. For example at 300 $V_{dc}$, the coupling coil and capacitor voltages can ring up to 2 kV and higher depending on the frequency and the loading.

In general, high current flow in excess of 10 A flows at a frequency greater than 10 kHz through the conductor constituting the primary coil of the primary circuit and through the conductor constituting the secondary coil of the primary circuit. Under such conditions, the skin effect can substantially increase the alternating current (AC) resistance of the primary coil and the secondary coil.

The onset of skin effect can be viewed as a frequency when the AC resistance $R_{ac}$ of a conductor starts to increase beyond its material dependent direct current resistance $R_{dc}$. For a wire having a circular cross-sectional area, the onset of the skin depth effect can be characterized with a critical frequency $f_c$, which can be defined as $$f_c = \frac{1}{2\pi\sigma\mu r_w^2},$$

where s is the conductivity of the material, m is the permeability of the material, and $r_w$ is the radius of the conductive wire. For a 20 AWG wire, the corresponding critical frequency is 1.9 kHz.

For high current applications, the diameter of the conductive wire needs to increase. The critical frequency decreases proportional to the inverse of the square of the diameter of the conductive wire. Thus, the skin effect is prevalent during operation of wireless charging coupling coil.

Figure 6A:
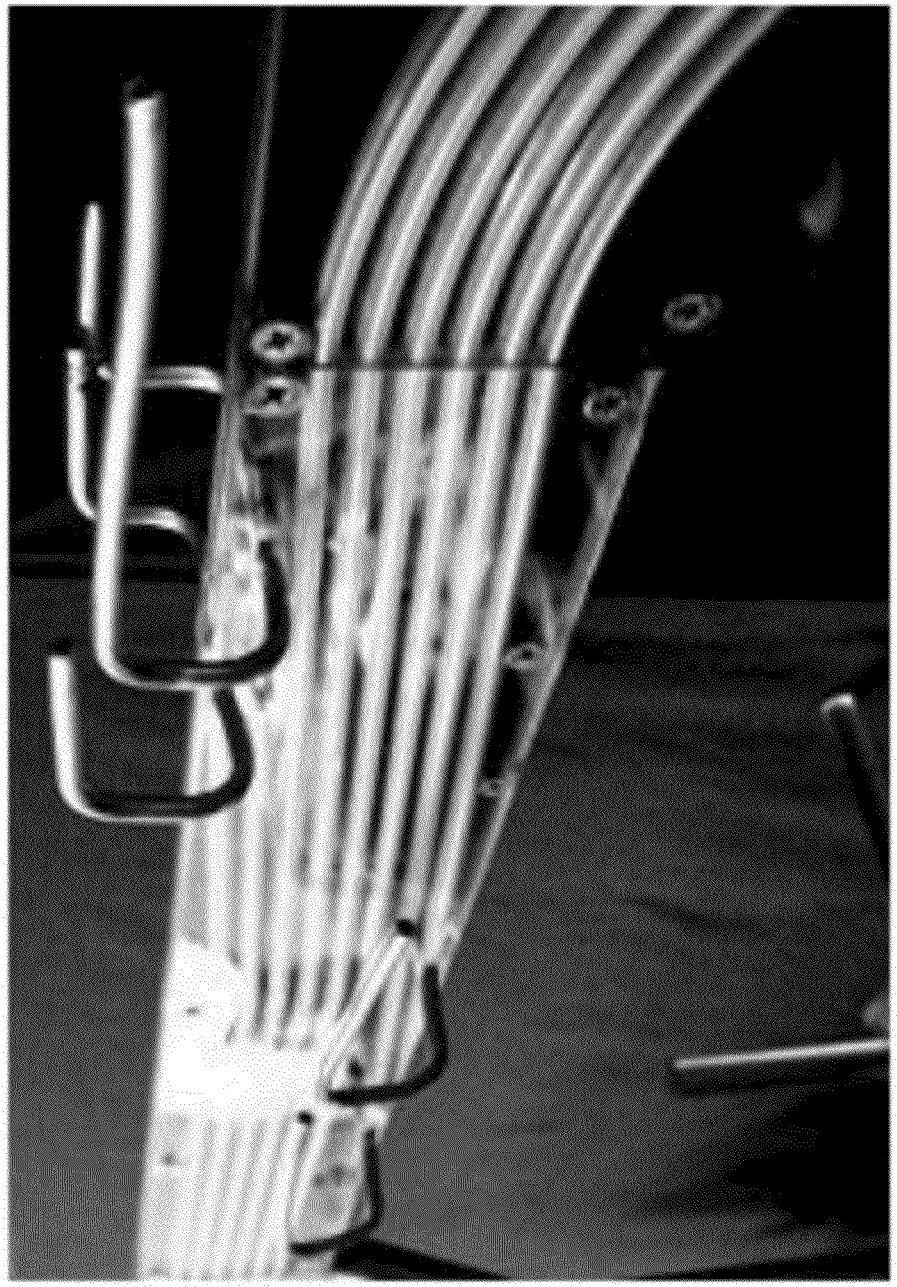
FIG. 6A is a photograph of a comparative exemplary structure including a wireless charging coupling coil.

Referring to FIG. 6A, a photograph shows a comparative exemplary structure including a wireless charging coupling coil. The wireless charging coupling coil of FIG. 6A includes a quad bundle of copper tubes (a set of four copper tubes forming a single bundle) wound in a square pattern and having three turns per tube. The copper tubes have an outer diameter of 0.25 inches (~6.35 mm). Each 0.25 inch diameter copper tube is suited to a high frequency operation by having the conducting material (copper) at the periphery where the AC current flows, and having a hollow cavity inside.

Figure 6B:
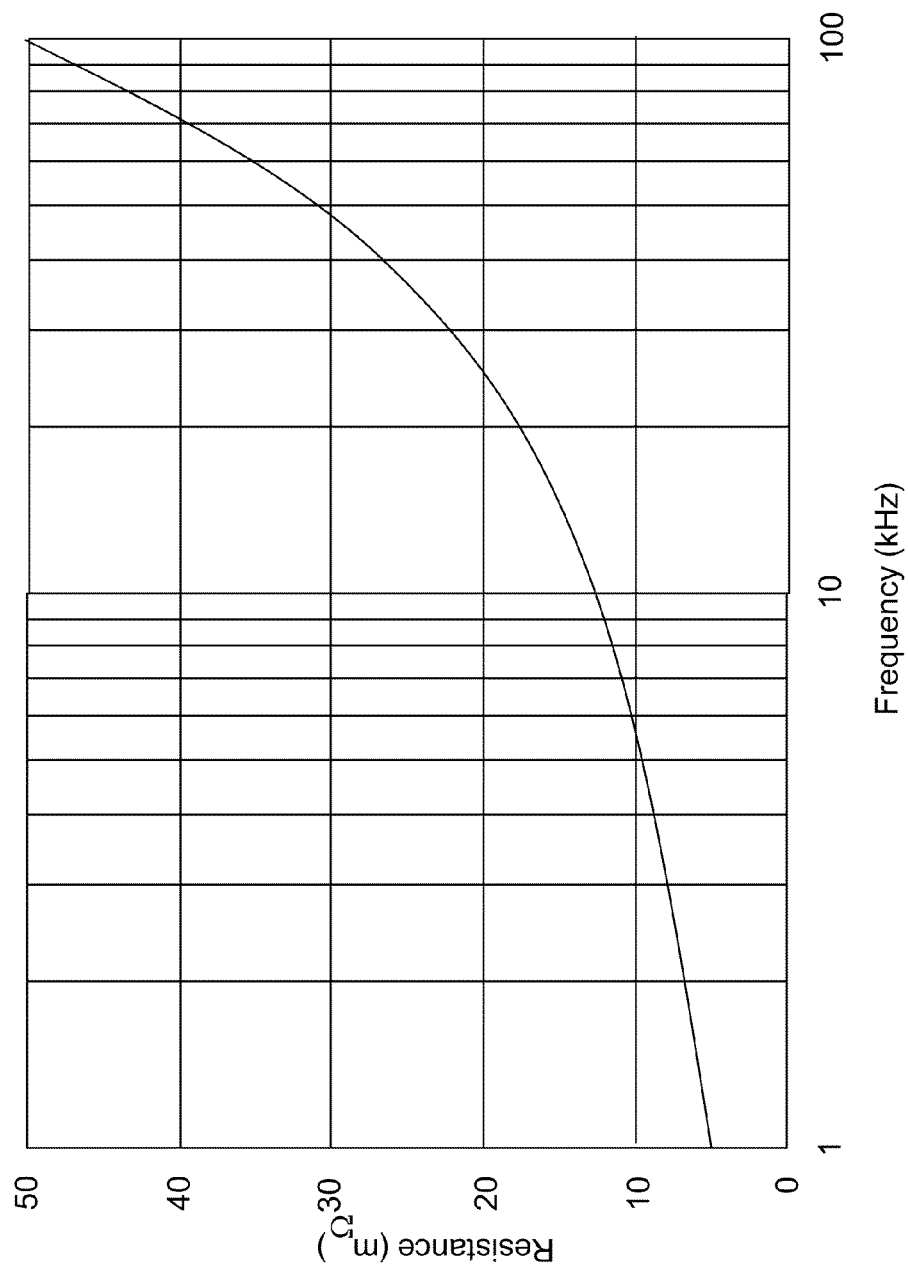
FIG. 6B is a graph of alternating current (AC) resistance of the wireless charging coupling coil of FIG. 6A.

Referring to FIG. 6B, a graph illustrates the alternating current (AC) resistance of the wireless charging coupling coil of FIG. 6A as a function of frequency of the AC current that passes through the wireless charging coupling coil. In this graph, the AC resistance Rac varies from 5 mΩ at 1 kHz to 50 mΩ at 100 kHz. This increase is about one order of magnitude. Thus, an increase of about one order of magnitude can be expected in power loss as the operational frequency of the wireless charging coupling coil changes from 1 kHz to 100 Hz unless the AC resistance $R_{ac}$ is reduced by other means. In wireless charging technology, the operating frequency of coupling coils is expected to be within the range from 20 kHz to 140 kHz depending on international standard committee decisions on interoperability.

When adjacent turns of a conductor are present, as in electric machine stator slots and in wireless charging coupling coils, the interaction of a first magnetic field generated by a first AC current flowing through a first turn of the conductor and a second magnetic field generated by a second AC current flowing through a second turn of the conductor conductors further alters the current distribution within each turn of the conductor. This interaction results in an increase in the AC resistance of the conductor. Such interaction among multiple paths of an AC current to redistribute electrical current within the conductor is referred to as proximity effect. The proximity effect increases the AC resistance of a conductor in addition to the increase in the AC resistance due to the skin effect.

Figure 7:
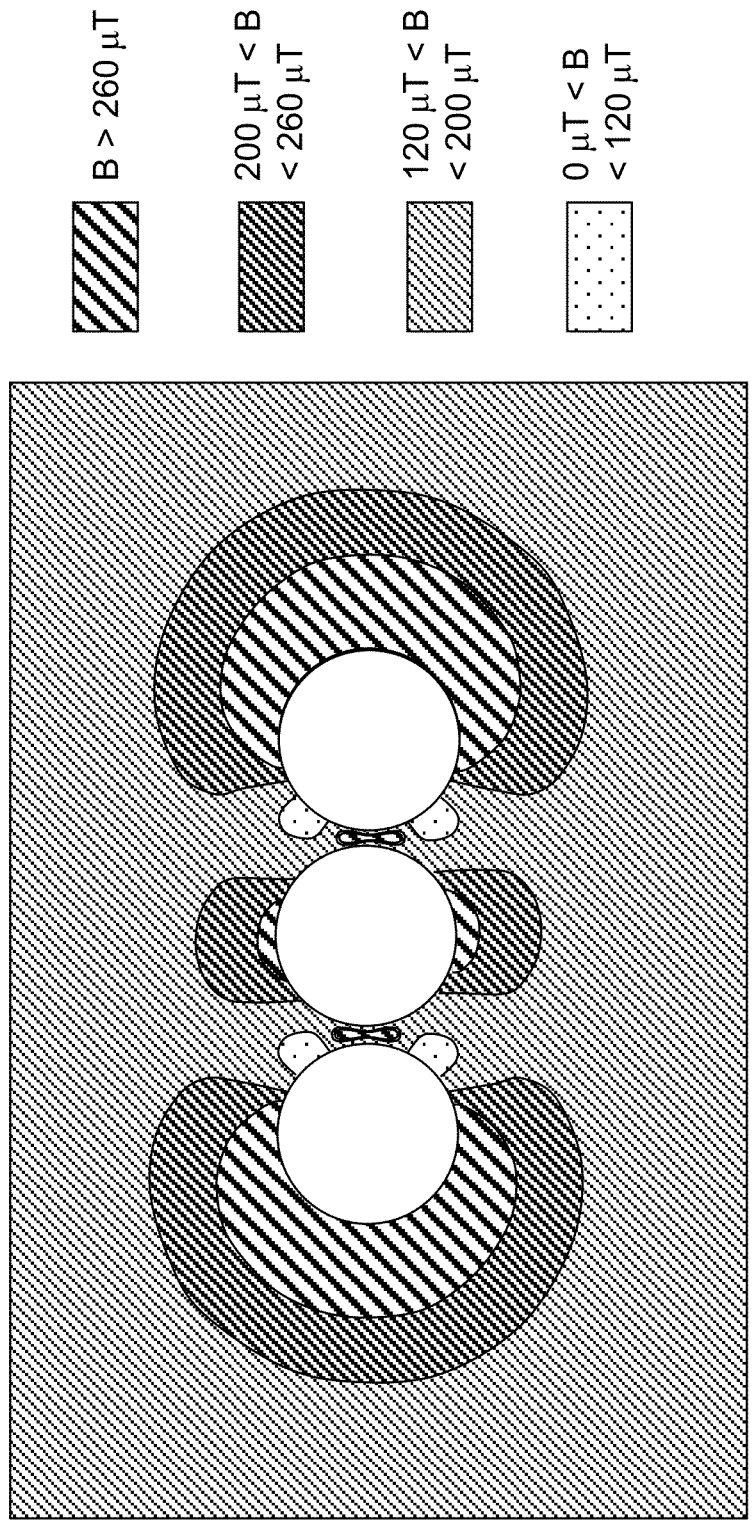
FIG. 7 is a contour plot of the magnitude of magnetic field generated by alternating current passing through a set of three parallel circular conductive wires, which illustrates the proximity effect.

Referring to FIG. 7, a contour plot of the magnitude of magnetic field generated by alternating current passing through a set of three parallel circular conductive wires illustrates the proximity effect. Three conductors each having a circular cross-sectional area are represented by three white circles. The direction of the cross-sectional view is perpendicular to the lengthwise direction of the three conductors. Boundaries between regions having different magnitudes are illustrated by contour lines, which include a contour line corresponding to the magnitude of 260 µT, a contour line corresponding to the magnitude of 200 µT, and a contour line corresponding to the magnitude of 120 µT. The current distribution within the three circulars can be estimated from the contour plot, e.g., by the location of the regions having the greatest magnitude of the magnetic field, e.g., regions having the magnitude greater than 260 µT. The electrical current flows predominantly underneath the outer side surface of each of the outer circular conductor, and underneath the topmost portion and the bottommost portion of the surface of the center circular conductor. Proximity effect exacerbates the increase in AC resistance caused by the skin effect, and can approximately doubling the AC resistance increase caused by the skin effect alone at a given operating frequency.

Techniques for reducing the proximity effect by shielding the magnetic field generated by different portions of the conductive coil cannot be employed for coupling coils because shield structures that shield external magnetic fields also shield the magnetic field generated from the inside of the shield structure, and disabling the magnetic coupling with another inductive coil To address the deleterious effect of the increase in the AC resistance in conventional conductive coils, conductive structures providing a high conductivity on a surface of a support structure is provided according to an embodiment of the present disclosure. The conductive structures of embodiments of the present disclosure can be advantageously employed to enhance the efficiency of coupling coils, and to reduce the size and the cost of the coupling coils. Specifically, one or more graphene layers are employed to reduce the impact of the skin effect and the proximity effect at high frequency operations.

Referring to FIGS. 8A and 8B, a first conductive structure including at least one graphene layer formed on a support structure according to an embodiment of the present disclosure is illustrated. FIG. 8A is a schematic view, and FIG. 8B is a cross-sectional view.

The conductive structure includes a support structure and at least one graphene layer formed around the support structure. The support structure can be a tube having a cavity therein. In one embodiment, the tube can be a copper tube such as a commercially available 6.35 mm diameter copper tube configured in a shape of at least one loop. The support structure is coating with at least one graphene layer such that the basal plane of each graphene layer is parallel to the local surface of the support structure. Each graphene layer is globally bent around the support structure, e.g., the tube, so that the graphene layer is topologically homeomorphic to a tube. The coating of the at least one graphene layer provides high conductivity within the basal plane, and thus, along the lengthwise direction of the tube. The net effect of the presence of the coating of the at least one graphene layer on the outer surface of the tube is reduction of the resistance of the conductive structure relative to another conductive structure that does not include any graphene layer.

The at least one graphene layer can be formed directly on the surface of the support structure. In one embodiment, the at least one graphene layer can be formed on the outer surface of the support structure without any metallic seed layer.

In a non-limiting illustration of a method for forming the at least one graphene layer, a plurality of graphene layers can be grown at a growth rate of about 35 nm/min at an elevated temperature of 1,000° C. in an oven including the ambient of a mixture of hydrogen ($H_2$) and methane ($CH_4$) in the presence of a 13.56 MHz radio frequency (RF field) at 1 kW power level.

In one embodiment of the present disclosure, a conductive structure includes a support structure and a coating of at least one graphene layer. The support structure extends along a lengthwise direction. For example, the support structure can be a solid rod or a hollow tube. Further, the support structure can be a plurality of stranded wires. For example, the support structure can be a Litz cable, the graphene layer can be coated on physically exposed outer surfaces of the Litz cable in a manner that contiguously surrounds the Litz cable. The coating of the at least one graphene layer circumferentially surrounds the support structure. A basal plane of the at least one graphene layer is tangential to a local surface of the support structure at each point in a circumference of the support structure.

In one embodiment, the support structure can have a constant cross-sectional area and a constant cross-sectional shape in a plurality of cross-sectional planes that are laterally spaced and are perpendicular to the lengthwise direction of the support structure. In one embodiment, the support structure can be a rod having a constant cross-sectional shape and area irrespective of the location of the cross-sectional planes. In another embodiment, the support structure can have a shape of a tube with a cavity therein. The support structure can have a gradual bending on a macroscopic scale, e.g., can have a curvature with a curvature of radius on the order of 1 cm or greater, so that the lengthwise direction changes gradually on a macroscopic scale.

In one embodiment, the support structure can include a metallic material such as Cu, Al, W, Au, Ag, Ta, Ti, a conductive metallic nitride, and/or a conductive metallic oxide. In one embodiment, the metallic material of the support structure can include at least one of copper, nickel, and aluminum.

In one embodiment, the support structure can be a copper tube. For example, the copper tube can have an outer diameter from 2 mm to 10 cm, and an inner diameter having a value in a range from 50% to 99.9% of a value for the outer diameter.

In one embodiment, the support structure can include at least one of a dielectric material and a semiconductor material. The dielectric material or the semiconductor material can be selected as a material capable of withstanding the processing temperature of about 1,000° C. for depositing the at least one graphene layer. In one embodiment, the support structure can include silicon oxide or a silicon bar.

The support structure, which may be a tube having a cavity therein or a solid block without a cavity therein, can include a dielectric material such as glass fiber or an insulating plastic material, or can be a composite or an alloy of a metallic material and a non-metallic material that exhibits high electrical conductivity. In one embodiment, the support structure can include a plurality of materials to provide different mechanical and electrical characteristics. For example, the support structure can include a dielectric material laterally surrounding a conductive material, or a conductive material laterally surrounding a dielectric material. Each of the materials for the support structure can be provide, for example, to provide enhanced mechanical strength, enhanced thermal conductivity, enhanced electrical conductivity, enhanced flexibility, or any combinations thereof.

In one embodiment, the at least one graphene layer can have a thickness in a range selected from a thickness of a single graphene layer to 100 nm. In one embodiment, the at least one graphene layer can include at least a contiguous graphene layer that contiguously extends around an entirety of the circumference. A curved plane including the basal plane of the contiguous graphene layer can be topologically homeomorphic to a tube.

In one embodiment, the conductive structure can be configured to enclose an area. Further, the conductive structure can be configured to generate, or capture, a flux of a magnetic field that passes through the enclosed area. In one embodiment, the at least one graphene layer can include a plurality of graphene layers. In one embodiment, at least 20% of the plurality of graphene layers can be metallic graphene layers. In one embodiment, at least 70% of the plurality of graphene layers can be metallic graphene layers.

In one embodiment, the conductive structure can be employed to pass alternating current (AC) electrical current therethrough. A predominant portion (i.e., greater than 50%) of the AC electrical current can flow through the coating of the at least one graphene layer. In one embodiment, the AC electrical current can have a frequency greater than 10 kHz.

In one embodiment, the conductive structure can be employed as a coupling coil for coupling a magnetic field with another coupling coil. In this case, the coupling coil includes the support structure and the coating of the at least one graphene layer. The support structure can be generally shaped to provide at least one loop and extending along the lengthwise direction at each portion of the support structure. The coating of at least one graphene layer circumferentially surrounds the support structure. A basal plane of the at least one graphene layer is tangential to a local surface of the support structure at each point in a circumference of the support structure. The coupling coil can be configured to enclose an area, and can be configured to generate, or capture, a flux of a magnetic field that passes through the enclosed area.

In one embodiment, the at least one graphene layer has a thickness in a range selected from a thickness of a single graphene layer to 1,000 nm. In one embodiment, the at least one graphene layer can include a plurality of graphene layers, and at least 20% of the plurality of graphene layers can be metallic graphene layers. In one embodiment, at least 70% of the plurality of graphene layers can be metallic graphene layers.

In one embodiment, a structure including the coupling coil and a second coupling coil can be employed. The second coupling coil can include a second support structure and a second coating of at least another graphene layer. The second support structure can be generally shaped to form at least another loop and extending along the lengthwise direction at each portion of the second support structure. The second coating of at least another graphene layer circumferentially surrounds the second support structure. The basal plane of the at least another graphene layer is tangential to a local surface of the second support structure at each point in a circumference of the second support structure.

In one embodiment, the second support structure can have a constant cross-sectional area and a constant cross-sectional shape along the lengthwise direction of the second support structure.

In one embodiment, the at least another graphene layer can have a thickness in a range selected from a thickness of a single graphene layer to 1,000 nm.

In one embodiment, the coupling coil and the second coupling coil can be positioned such that at least 10% of magnetic flux generated by one of the coupling coil and the second coupling coil is captured by another of the coupling coil and the second coupling coil.

Alternating current (AC) electrical current can be passed through the coupling coil. A predominant portion of the AC electrical current flows through the coating of the at least one graphene layer. In one embodiment, the AC electrical current can have a frequency greater than 10 kHz.

Referring to FIG. 8C, a variation of the first conductive structure according to an embodiment of the present disclosure is shown. The variation of the first conductive structure includes an insulator layer that circumferentially surrounds the coating of the at least one graphene layer illustrated in FIGS. 8A and 8B. The insulator layer can form a protective coating, and can include a polymer such as polyimide, polypropylene, and/or polyvinyl chloride (PVC).

Figure 8D:
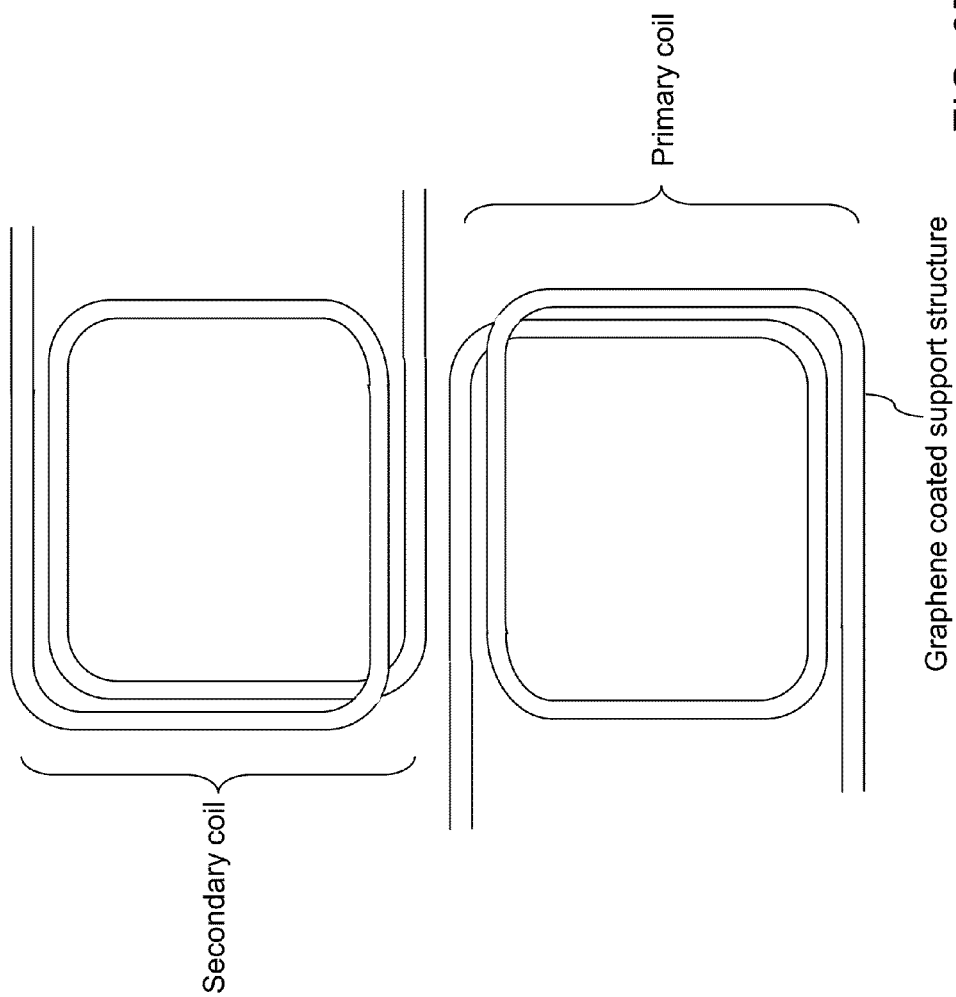
FIG. 8D is a schematic illustration of an exemplary set of coupling coils according to an embodiment of the present disclosure.

Referring to FIG. 8D, a portion of a wireless power transfer system is illustrated, which includes an exemplary set of coupling coils, i.e., a primary coil and a secondary coil. Each of the primary coil and the secondary coil can be a graphene coated support structure as illustrated in FIGS. 8A and 8B, or as illustrated in FIG. 8C.

In one embodiment of the present disclosure, a wireless power transfer system includes a primary circuit and a secondary circuit. The primary circuit can include a grid converter and a primary coil located in a primary pad. The secondary circuit can be a secondary circuit located in a vehicle, and includes a secondary coil.

The primary coil can include a first support structure generally shaped to provide at least one first loop and extending along a lengthwise direction at each portion of the primary coil. In one embodiment, the primary coil can further include a first coating of at least one graphene layer that circumferentially surrounds the support structure. A basal plane of the at least one graphene layer is tangential to a local surface of the first support structure at each point in a circumference of the support structure.

The secondary coil can include a second support structure generally shaped to provide at least one second loop and extending along a lengthwise direction at each portion of the secondary coil. In one embodiment, the secondary coil can further include a second coating of at least one graphene layer that circumferentially surrounds the support structure. A basal plane of the at least one graphene layer is tangential to a local surface of the support structure at each point in a circumference of the support structure.

Each of the primary coil and the secondary coil can have the same features as the conductive structure of the present disclosure as discussed above. In one embodiment, the wireless power transfer system of the present disclosure can be operated by providing input power to the primary circuit through the grid converter, and by transferring power to the vehicle by coupling an alternating current (AC) magnetic field generated by the primary coil and with the secondary coil.

In one embodiment, the AC current within the primary coil can flow predominantly through the first coating of the at least one graphene layer. In one embodiment, the AC current within the secondary coil can flow predominantly through the second coating of the at least another graphene layer.

Referring to FIGS. 9A and 9B, a second conductive structure according to an embodiment of the present disclosure includes a plurality of graphene layers formed on a metallic surface provided on the outside of the support structure.

In one embodiment, the support structure can include a metallic material. The metallic material that can be employed for the support structure has a melting point greater than 1,000° C. to prevent melting during deposition of the plurality of graphene layers. Non-limiting examples of the material that can be employed for the support structure include nickel, a refractory metal, and combinations thereof. In this case, the plurality of graphene layers is in direct contact with the surfaces of the support structure. In this embodiment, the plurality of graphene layers of FIGS. 9A and 9B can substitute the at least one graphene layer illustrated in FIGS. 8A, 8B, 8C, and 8D.

In another embodiment, the support structure can include any material having a melting temperature greater than 1,000° C. provided that a metallic seed layer is formed on the outer surface. Non-limiting examples of the material of the metallic seed layer include nickel, a refractory metal, and combinations thereof. In this case, the metallic seed layer contiguously surrounds, and contacts, outer surfaces of the support structure. The outer surfaces of the metallic seed layer are in direct contact with the plurality of graphene layers. In this embodiment, the combination of the metallic seed layer and the plurality of graphene layers of FIGS. 9A and 9B can substitute the at least one graphene layer illustrated in FIGS. 8A, 8B, 8C, and 8D.

The metallic seed layer can be a thin metallic coating. For example, the thin metallic coating can have a thickness from one atomic thickness of the material of the metallic seed layer to 1 mm, although greater thicknesses can also be employed.

In one embodiment, a relative dense graphene layer can be formed on the metallic surface of the support substrate or the metallic seed layer. In one embodiment, about 20 graphene sheets spaced over a 5 microns can be grown on the metallic surface such that the axial dimension of the graphene layer is aligned along the lengthwise direction of the support structure as illustrated in FIG. 9A. In one embodiment, the thickness of individual graphene layers can be from 0.2 micron to 6 micron.

In an exemplary illustration, the support structure can be a copper tube having a length from 2.5 m to 6 m and bent into a single turn coil having a diameter of about 700 mm. diameter hoop. The diameter of this single turn coil is the present maximum diameter proposed for 3 kW to 7 kW wireless charging by the SAE J2954 committee.

In one embodiment, each of the plurality of graphene layers can be formed on a nickel surface as a monolayer graphene sheet having a single atomic thickness of carbon. In one embodiment, the support structure can be a copper tube having a nickel coating, and the plurality of graphene layers can be aligned along the radial direction of the nickel-coated copper tube, and have a width in the range from 0.2 micron to 0.6 micron. The plurality of graphene layers can have a lateral extent in a range from 3 microns to 5 microns along the lengthwise direction of the nickel-coated copper tube.

In one embodiment, the plurality of graphene layers can be grown in the axial direction and overlap at the edges of their basal plane to provide longitudinal and transverse continuity. High frequency AC current can flow through the basal plane of a graphene layer, and then tunnel through another graphene layer at an edge at with two graphene layers overlap. In one embodiment, the metallic material of the support structure or the metallic seed layer can provide an alternative conductive path that reduces the overall resistivity of the conductive structure, and provides an alternate current conduction path in case a structural defect in a graphene layer causes disruption in the current path. The AC current that flows within each of the plurality of graphene layers is a ballistic current flow within the basal plane.

In one embodiment, the metallic surface can be a nickel surface, and the plurality of graphene layers can form an alloy with nickel surface. In this case, a rugged bond is formed at the interface between the nickel surface and the graphene layer in contact with the nickel surface to provide high conductivity between the two layers. Electrical conductivity within the basal plane of each graphene layer is ballistic transport, and therefore has extremely low resistance. Refractory materials such as tantalum, titanium and tungsten can also be employed in lieu of nickel.

In one embodiment, the plurality of graphene layers can collectively extend around the entirety of the circumference of a conductive structure, e.g., the primary coil and/or the secondary coil. In one embodiment, the plurality of graphene layers can include at least one graphene layer that does not extend around the entirety of the circumference.

Referring to FIG. 9C, the second conductive structure can be coated with an insulator layer. The insulator layer can form a protective coating, and can include a polymer such as polyimide, polypropylene, and/or polyvinyl chloride (PVC).

The various structures of the present disclosure can be employed to reduce the impact of the skin effect and the proximity effect that are prevalent in high frequency AC applications. The various structures of the present disclosure can be employed in a wireless power transfer system to reduce power loss in coupling coils to less than 3% of the throughput power, thereby enhancing coupling efficiency of the wireless power transfer system.

Further, the various structures of the present disclosure can be employed in electric machines and power systems to reduce the power loss in high frequency AC applications. Electron flow that otherwise is impeded by phonon scattering through metallic conductors and by high density concentration of electrical current due to AC effects near the surfaces of a conductor is facilitated through ballistic transport of electrons within the basal plane of at least one graphene layer, thereby providing virtually zero phonon scattering and resultant low resistance transmission of high frequency AC current.

While the invention has been described in terms of specific embodiments, it is evident in view of the foregoing description that numerous alternatives, modifications and variations will be apparent to those skilled in the art. Each of the embodiments described herein can be implemented individually or in combination with any other embodiment unless expressly stated otherwise or clearly incompatible. Other suitable modifications and adaptations of a variety of conditions and parameters normally encountered in image processing, obvious to those skilled in the art, are within the scope of this invention. All publications, patents, and patent applications cited herein are incorporated by reference in their entirety for all purposes to the same extent as if each individual publication, patent, or patent application were specifically and individually indicated to be so incorporated by reference. Accordingly, the invention is intended to encompass all such alternatives, modifications and variations which fall within the scope and spirit of the invention and the following claims.

What is claimed is:

1. A structure comprising a first coupling coil for coupling a magnetic field with second coupling coil, said first coupling coil comprising:
 a support structure generally shaped to provide at least one loop and extending along a lengthwise direction at each portion thereof;
 a coating of at least one graphene layer that circumferentially surrounds said support structure, wherein a basal plane of said at least one graphene layer is tangential to a local surface of said support structure at each point in a circumference of said support structure; and
 a metallic seed layer comprising at least one of nickel and a refractory metal, and contiguously surrounding and contacting outer surfaces of said support structure, and in direct contact with said at least one graphene layer.

2. The structure of claim 1, wherein said support structure has a shape of a tube with a cavity therein.

3. The structure of claim 1, wherein said support structure comprises a metallic material.

4. The structure of claim 1, further comprising an insulator layer that circumferentially surrounds said coating.

5. The structure of claim 1, wherein said at least one graphene layer comprises a plurality of graphene layers that collectively extend around an entirety of said circumference, wherein said plurality of graphene layers comprise at least one graphene layer that does not extend around said entirety of said circumference.

6. The structure of claim 1, wherein said first coupling coil is configured to enclose an area, and is configured to generate, or capture, a flux of a magnetic field that passes through said enclosed area.

7. The structure of claim 1, wherein said at least one graphene layer comprises a plurality of graphene layers, and at least 20% of said plurality of graphene layers is metallic graphene layers.

8. The structure of claim 1, wherein said structure further comprises said second coupling coil, and said second coupling coil comprises:
 a second support structure generally shaped to form at least another loop and extending along a lengthwise direction at each portion thereof;
 a second coating of at least another graphene layer that circumferentially surrounds said second support structure, wherein a basal plane of said at least another graphene layer is tangential to a local surface of said second support structure at each point in a circumference of said another support structure.

9. The structure of claim 8, wherein said first coupling coil and said second coupling coil are positioned such that at least 10% of magnetic flux generated by one of said first coupling coil and said second coupling coil is captured by another of said first coupling coil and said second coupling coil.

10. A conductive structure comprising:
 a support structure extending along a lengthwise direction;
 a coating of at least one graphene layer that circumferentially surrounds said support structure, wherein a basal plane of said at least one graphene layer is tangential to a local surface of said support structure at each point in a circumference of said support structure; and
 a metallic seed layer comprising at least one of nickel and a refractory metal, and contiguously surrounding and contacting outer surfaces of said support structure, and in direct contact with said at least one graphene layer.

11. The conductive structure of claim 10, wherein said support structure has a shape of a tube with a cavity therein.

12. The conductive structure of claim 11, wherein said support structure comprises a metallic material.

13. The conductive structure of claim 10, wherein said at least one graphene layer comprises at least a contiguous graphene layer that contiguously extends around an entirety of said circumference.

14. The conductive structure of claim 10, wherein said at least one graphene layer comprises a plurality of graphene layers that collectively extend around an entirety of said circumference, wherein said plurality of graphene layers comprise at least one graphene layer that does not extend around said entirety of said circumference.

15. The conductive structure of claim 10, wherein said conductive structure is configured to enclose an area, and is configured to generate, or capture, a flux of a magnetic field that passes through said enclosed area.

16. A wireless power transfer system comprising:
- a primary circuit including a grid converter and a primary coil located in a primary pad; and
- a secondary circuit located in a vehicle and comprising a secondary coil, wherein said primary coil comprises:
- a first support structure generally shaped to provide at least one first loop and extending along a lengthwise direction at each portion thereof;
- a first coating of at least one graphene layer that circumferentially surrounds said support structure, wherein a basal plane of said at least one graphene layer is tangential to a local surface of said support structure at each point in a circumference of said support structure; and
- a metallic seed layer comprising at least one of nickel and a refractory metal, and contiguously surrounding and contacting outer surfaces of said first support structure, and in direct contact with said at least one graphene layer.

17. The wireless power transfer system of claim 16, wherein said secondary coil comprises:
- a second support structure generally shaped to form at least another loop and extending along a lengthwise direction at each portion thereof;
- a second coating of at least another graphene layer that circumferentially surrounds said second support structure, wherein a basal plane of said at least another graphene layer is tangential to a local surface of said second support structure at each point in a circumference of said second support structure.

18. The wireless power transfer system of claim 16, wherein said first support structure has a shape of a tube with a cavity therein.

19. The wireless power transfer system of claim 16, wherein said first support structure comprises a metallic material.

20. The wireless power transfer system of claim 16, wherein said primary coil further comprises an insulator layer that circumferentially surrounds said first coating.

* * * * *